United States Patent
Schwaninger (10) Patent No.: US 9,323,512 B2
(45) Date of Patent: Apr. 26, 2016

(54) TOOLS AND METHODS FOR COPYING APPLICATIONS

(71) Applicant: Christian Schwaninger, Eppelheim (DE)

(72) Inventor: Christian Schwaninger, Eppelheim (DE)

(73) Assignee: SAP SE, Walldorf (DE)

( * ) Notice: Subject to any disclaimer, the term of this patent is extended or adjusted under 35 U.S.C. 154(b) by 278 days.

(21) Appl. No.: 13/826,201

(22) Filed: Mar. 14, 2013

(65) Prior Publication Data

US 2014/0282496 A1   Sep. 18, 2014

(51) Int. Cl.
*G06F 9/44* (2006.01)
*G06F 9/445* (2006.01)

(52) U.S. Cl.
CPC ... *G06F 8/60* (2013.01); *G06F 8/63* (2013.01)

(58) Field of Classification Search
None
See application file for complete search history.

(56) References Cited

U.S. PATENT DOCUMENTS

| | | |
|---|---|---|
| 5,247,683 A | 9/1993 | Holmes et al. |
| 5,555,416 A | 9/1996 | Owens et al. |
| 6,161,176 A | 12/2000 | Hunter et al. |
| 6,513,045 B1 | 1/2003 | Casey et al. |
| 6,539,372 B1 | 3/2003 | Casey et al. |
| 6,546,404 B1 | 4/2003 | Davis et al. |
| 6,735,765 B1 * | 5/2004 | Schumacher .......... 717/164 |
| 7,346,766 B2 | 3/2008 | Mackin et al. |
| 7,461,097 B2 | 12/2008 | Stahl et al. |
| 7,831,568 B2 | 11/2010 | Sattler et al. |
| 8,131,644 B2 | 3/2012 | Sattler et al. |
| 8,135,659 B2 | 3/2012 | Gaffga et al. |
| 8,255,429 B2 | 8/2012 | Lange et al. |
| 8,396,893 B2 | 3/2013 | Gaffga et al. |
| 8,700,876 B2 | 4/2014 | Shah et al. |
| 2005/0283564 A1 * | 12/2005 | LeCrone et al. ........ 711/100 |
| 2006/0026587 A1 * | 2/2006 | Lemarroy et al. ...... 717/170 |
| 2013/0117289 A1 | 5/2013 | Fischer et al. |

* cited by examiner

*Primary Examiner* — Chuck Kendall
(74) *Attorney, Agent, or Firm* — Schwegman Lundberg & Woessner, P.A.

(57) ABSTRACT

Various embodiments herein include at least one of systems, methods, and software to export and import an application. Some embodiments include a user selecting a source system and a target system, and automatically exporting an application from a source system and automated import of this export to the target system. Exporting an application can include testing whether a software export tool version is compatible with a software import tool version, and installing a compatible software import tool on the target system. Some embodiments include informing the user that the application has been successfully imported.

20 Claims, 5 Drawing Sheets

TOOLS AND METHODS FOR COPYING APPLICATIONS

BACKGROUND INFORMATION

In today's networked computing environment, organizations may have many applications used to support operations, such as enterprise-class computing applications (i.e., Enterprise Resource Planning (ERP) and Customer Relationship Management (CRM) Applications). These applications may be installed on computer systems using various operating systems, and may use various database system management systems (DBMS). Such applications may be copied from a between computer systems, for example, when migrating between computer systems or between application versions. Because of the use of various database systems and various computer operating systems, and further due to the complex nature of such applications and their configurations, manual application copying can be time-consuming, error-prone, and costly.

DETAILED DESCRIPTION

To support various organizational applications used to support operations, application providers and requesters (e.g., users) may perform frequent copies of the applications and data stored and maintained thereby. The applications may include one or more of binary files (e.g., executable files), configuration files storing configuration settings and additional content and application add-ons, data files, and other such data. In some examples, the application may include an enterprise-class computing application, for example, one or more of the applications from SAP of Walldorf, Germany.

Various quality assurance (QA) tasks may operate directly on an application, and to avoid adversely affecting application operation, the QA tasks may create or refresh a QA copy of the system. System copies may be taken to create or refresh one or more QA copies when the operating system (OS) of such an application is to be changed, such as when the OS is to be exchanged with a newer release of the same OS or if the existing OS should be exchanged with a different OS. In other instances, QA copies may be taken when the database management system (DBMS) is to be changed (e.g., Oracle Database to Sybase, HANA), or when the OS and the database should be changed at the same time. Additionally, copies may be taken of a QA application copy to move the QA copy to a productive state once the QA copy has been subjected to sufficient QA testing to ensure proper operability after OS and DBMS changes, configuration changes, or addition of new content or application add-ons. Regardless of the particular purpose of or reason for taking an application copy, ensuring a copy taken and instantiated in a different system is an important task, and has typically been a laborious, error prone, costly, and risk intensive task.

Application copying to date has been a manual task, often times performed four to twelve times per productive system per year. For example, an application copy effort is typically performed as a series of manual tasks. Such application copies are often taken on a predictable schedule and seldom on an ad-hoc basis. Further, such copies are often made between different systems with varying hardware, operating environments, and DBMSs. The application copy tool described herein operates to automate the application copy process. For example, using the application copy tool described herein, the application copy is automated such that the user may select only the source system and the target system. After the initial selection, the process may be automatically executed, including automated export of the application from the source and automated import of this export to the target. In some embodiments, the initial selection may only include automated export of the application, after which the exported application may be shipped to a second party. Upon receiving an application export, the second party may import the application manually, or may use the system copy tool to import the application to a target system. In addition to importing a previously automatically exported application, the application copy tool may be used to import an application that was manually exported. Upon completion of any of these export and import operations, the application copy tool may inform the user (e.g., via e-mail, SMS text message, or other message type) that the new application has been successfully imported.

Various embodiments of an application copy tool as described herein may not only simplify application copying, but also can provide additional ancillary benefits. For example, database defragmentation, standardization of application exports, and application migration risk reduction. Application migration risk reduction may be realized in situations such as when an organization desires to build a new QA application instance or development instance to test a system, OS, DBMS, or other system variable that may affect application performance. Some embodiments herein allow the organization to try such different system variables in an easier manner. Further, application exports can easily become incompatible, such as when the application is exported in an order different from that expected by an application import tool. A non-standardized application export may require manual changes to the application, or may prevent application importation. Embodiments herein mitigate such risks, such as through application export standardization.

Various embodiments herein include at least one of systems, methods, and software to export and import an application from one system to another. The systems may be physical hardware systems on which an OS is present. However, in some embodiments, one or more of the systems may be virtual machines that exist in a virtualized computing environment. Regardless, references to systems herein are with regard to an operating platform on which an application executes, which may include one or more computing devices. References to applications are generally to software applications that execute on systems and their associated binary, data, and configuration files.

Further, some embodiments of the application copy tool herein perform application copying tasks in response to a user selecting a source application instance to be copied and a target system to which the application instance is to be copied. The application copy tool in such embodiments, upon receipt of such input may then operate by exporting that source application from a source system to a target system. Exporting the application can include testing whether the application copy tool is compatible with a target system OS. When the application copy tool is incompatible with the target system OS, the application copy tool may install or otherwise access an application copy tool that is compatible with the target system OS and continue operation. However, other embodiments may include writing to a log, or transmitting an incompatibility message to a user. These and other embodiments are described, with reference to the figures, herein.

In the following detailed description, reference is made to the accompanying drawings that form a part hereof, and in which is shown by way of illustration specific embodiments in which the inventive subject matter may be practiced. These embodiments are described in sufficient detail to enable those skilled in the art to practice them, and it is to be understood that other embodiments may be utilized and that structural, logical, and electrical changes may be made without departing from the scope of the inventive subject matter. Such embodiments of the inventive subject matter may be referred to, individually and/or collectively, herein by the term "invention" merely for convenience and without intending to limit the scope of this application voluntarily to any single invention or inventive concept if more than one is in fact disclosed. The following description is, therefore, not to be taken in a limited sense, and the scope of the inventive subject matter is defined by the appended claims.

The functions or algorithms described herein are implemented in hardware, software or a combination of software and hardware in one embodiment. The software comprises computer executable instructions stored on computer readable media such as memory or other type of storage devices. Further, described functions may correspond to modules, which may be software, hardware, firmware, or any combination thereof. Multiple functions are performed in one or more modules as desired, and the embodiments described are merely examples. The software is executed on a digital signal processor, ASIC, microprocessor, or other type of processor operating on a system, such as a personal computer, server, a router, or other device capable of processing data including network interconnection devices.

Some embodiments implement the functions in two or more specific interconnected hardware modules or devices with related control and data signals communicated between and through the modules, or as portions of an application-specific integrated circuit. Thus, the exemplary process flow is applicable to software, firmware, and hardware implementations.

Figure 1:
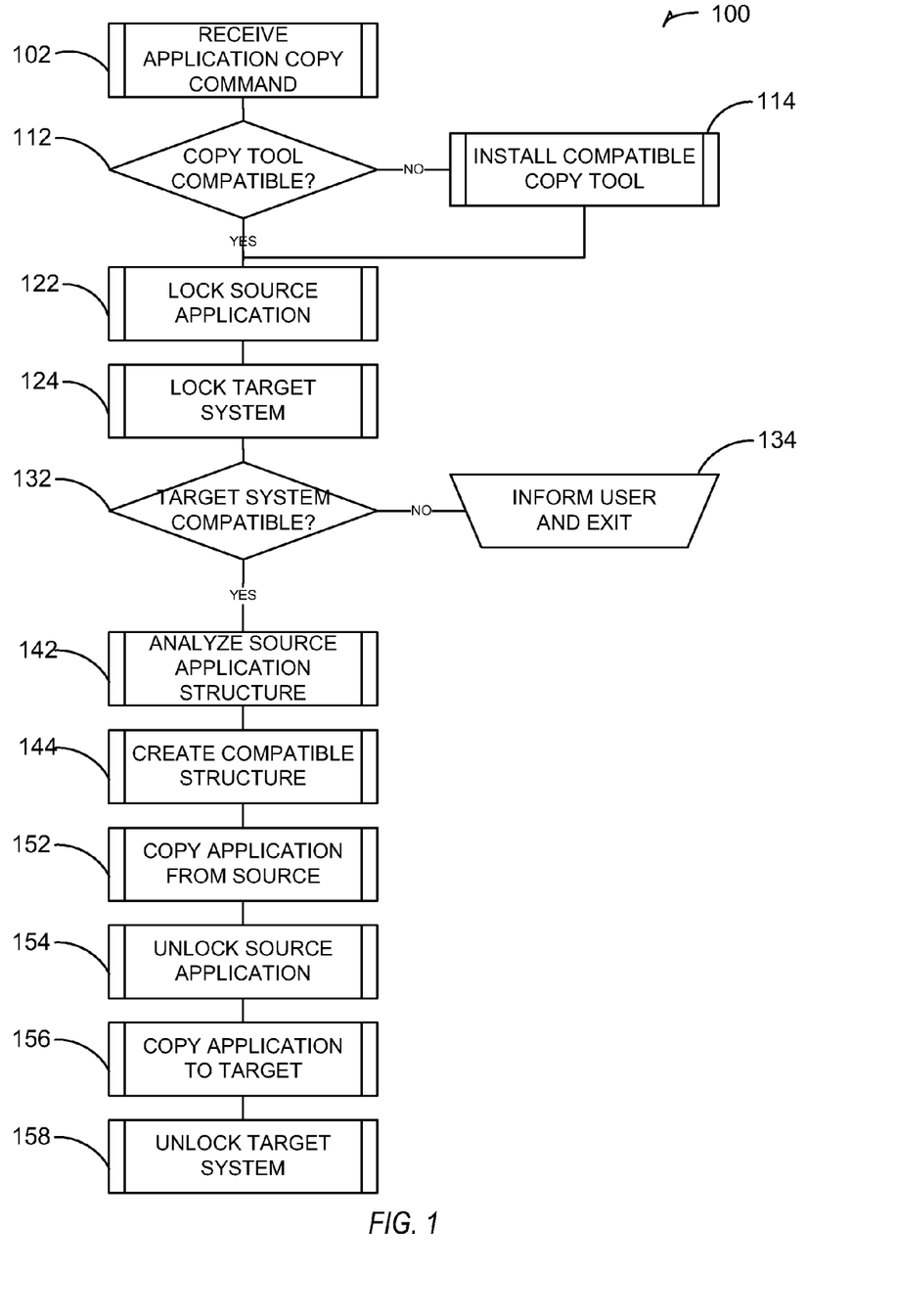
FIG. 1 is a logical block diagram of an application export/import method, according to an example embodiment.

FIG. 1 is a logical block diagram of an application export/import method 100, according to an example embodiment. A simple export/import method 100 embodiment may begin upon receiving 102 a command to copy an application. The application copy command may identify a source (i.e., an application instance to be copied) and a target system to which the application is to be copied. For example, the target may be a computer with an installed OS or a virtual machine. If a database system is included in or accessible by the target system, the command may include a designation of a target database. The source application typically includes binary files (e.g., executable files), configuration files (e.g., profile files), and data files. However, the data-makeup of the source application may vary from application to application and from embodiment to embodiment. Regardless, the binary files are typically executable and often consume the configuration and data files during operation. The example export/import method 100 may further include testing 112 whether an application copy tool is compatible with one or both of the source application and target system. If the application copy tool is not compatible with one or both, a compatible application copy tool may be installed 114 or otherwise obtained or called for remote execution, in some embodiments. Further, to prevent modifications to the source application or target system, one or both of the source application and target system may be locked 122, 124.

The export/import method 100, in some embodiments, may further test 132 whether the source application is compatible with the target system. Such testing 132 may include identifying and comparing the OS on which the source application is deployed and the target system OS. In some embodiments, the testing 132 may further include testing a database to see if it is compatible with the application copy tool. When the source application is not compatible with the target system, the export/import method 100 may inform the user of the incompatibility and exit. When the source application is compatible with the target system, the export/import method 100 may analyze 142 the source application structure and create 144 an equivalent, compatible structure (i.e., file and directory structures, database instances, and the like) on the target system.

The export/import method 100 may then copy 152 source application data. For example, the data may be copied 152 directly from the source application to the target system, or the data may be copied 152 from the source application to an intermediate storage, such as an external hard drive or to a storage medium accessible through a network. In some further embodiments, the source application data may be stored to a Small Computer System Interface (SCSI) data storage system. Once the data has been copied from the source application, the source application may be unlocked 154 to restore access to the application. The export/import method 100 may then copy 156 the data copied 152 from the source application to the target system. In embodiments where the data was stored to a SCSI data storage system, data may be copied 152 from the source application to the target system by decoupling a storage device to which the source application is copied and coupling the storage device to the target system. Copying 156 data to the target system may be automated, beginning automatically upon completion of copying 152 of data from the source application, upon completion of unlocking 154 the source application, or upon coupling the SCSI data storage device to the target system. Upon completion of copying 156 of data to the target system, the target system may be unlocked 158 to restore access to the system.

Figure 2:
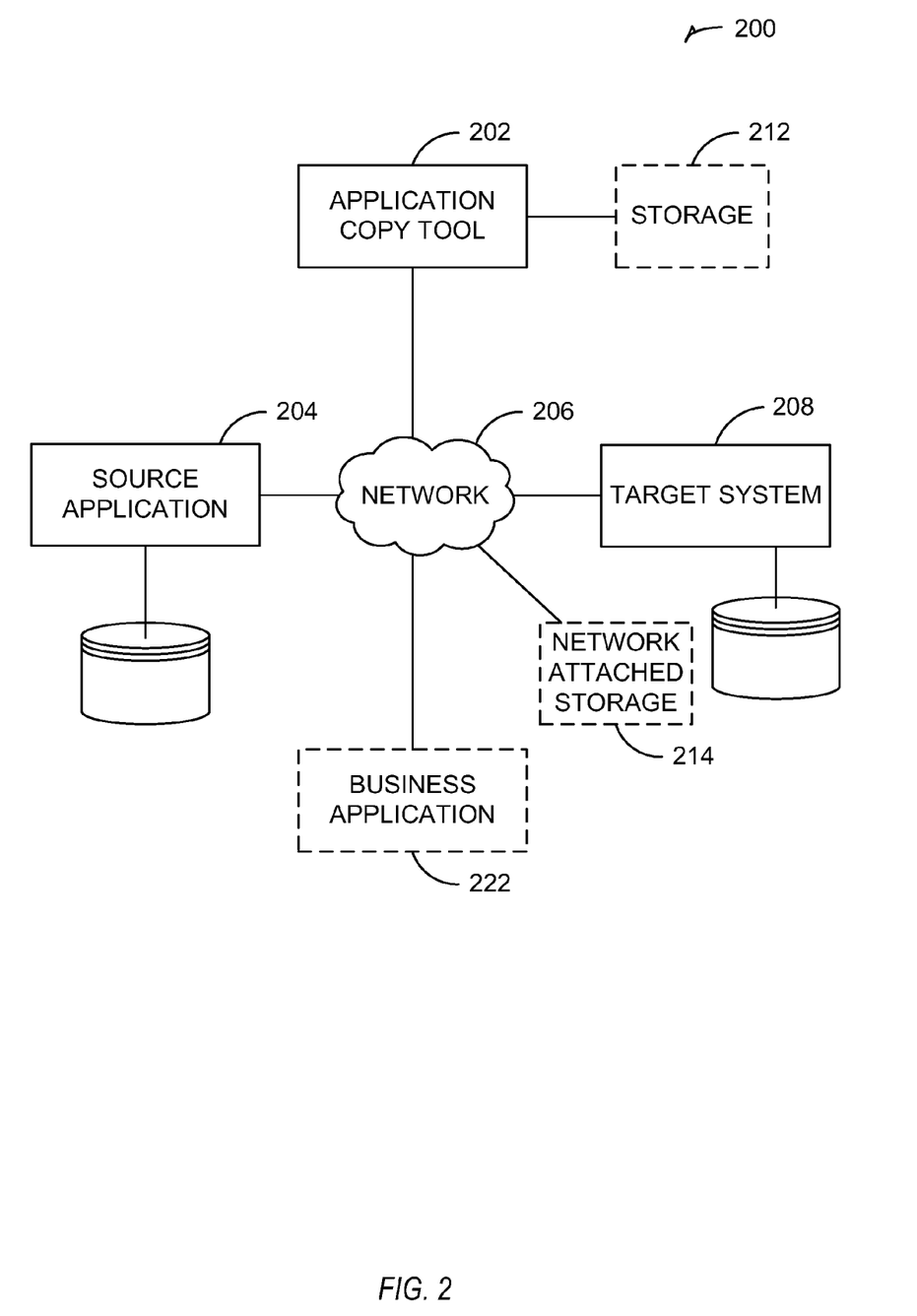
FIG. 2 is a logical block diagram of a system, according to an example embodiment.

FIG. 2 is a logical block diagram of a system 200, according to an example embodiment. The system 200 includes an application copy tool 202, a source application 204, a network 206, and a target system 208. The application copy tool 202 may export the source application 204, transfer the application export through the network 206 to the target system 208, and import the application copy into the target system 208. The system 200 may include storage 212 attached to the application copy tool 202, network attached storage (NAS) 214 attached to the network 206, or one or more other data storage devices and systems. The application copy tool 202 may export an application copy from the source application 204, and store the exported application in storage 212 or NAS 214. In some embodiments, the application copy tool 202 may also import a previously exported application copy from storage 212 or NAS 214, and import the application copy into the target system 208. A business application 222, an application server, or other application or system, in some embodiments, may access the source application 204 through the network 206. During an application export or import process, as performed at least in part by the application copy tool 202, the business application 222 and other applications that access the source application 204 may be disconnected from any source application 204 or otherwise blocked form modifying data within the source application 204 during the export or import process. Once the source application has been copied, source application 204 access may be restored.

Figure 3:
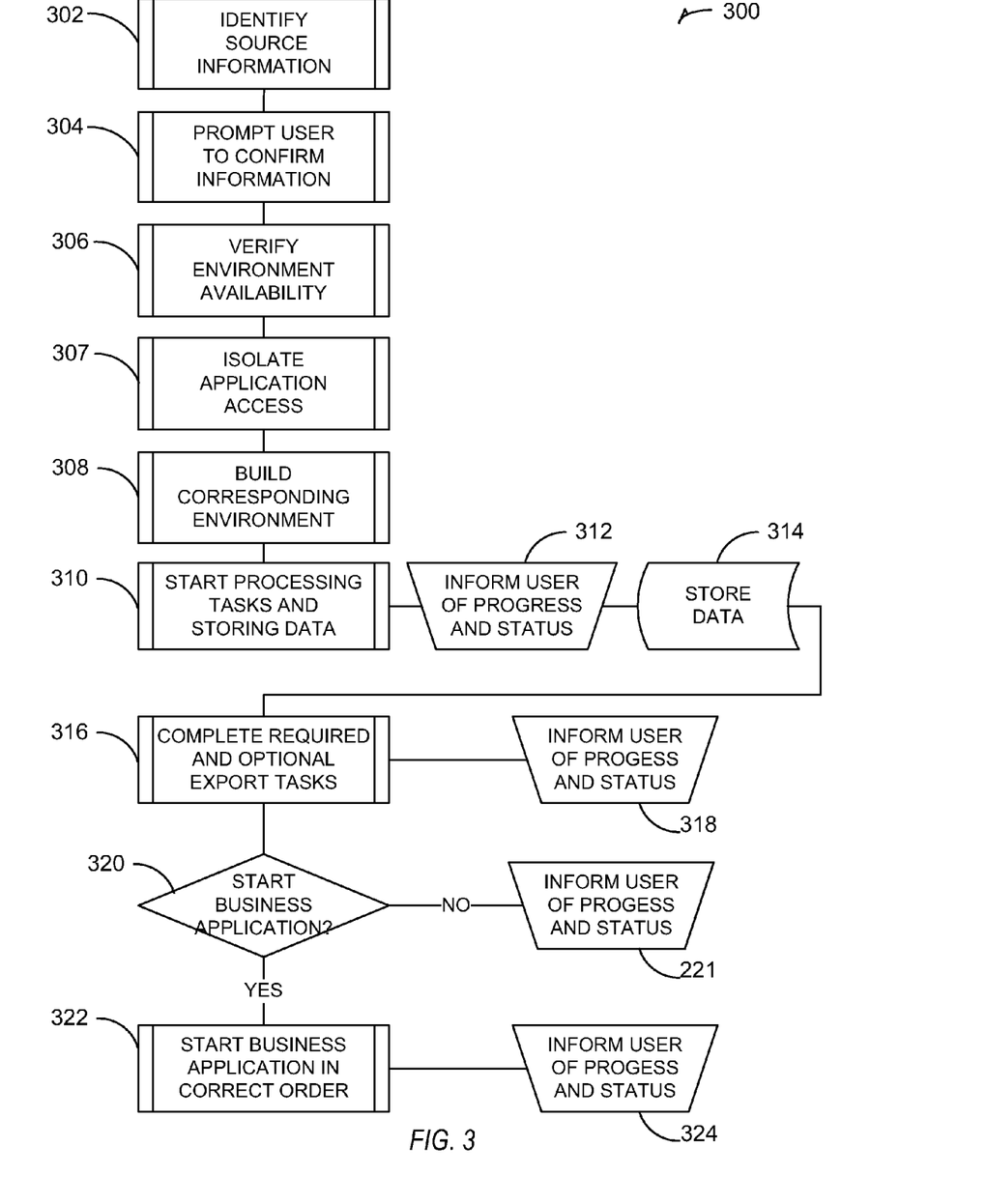
FIG. 3 is a logical block diagram of an application export method, according to an example embodiment.

FIG. 3 is a logical block diagram of an application export method 300, according to an example embodiment. The application export method 300 begins by identifying 302 source information. The source information can include identifying an OS/DBMS of hardware on which an application to be copied is instantiated. The source information can include optional pre-export tasks, including execution of one or more programs related to management of the system or application thereon. For example, a pre-export task can include execution of a local hard drive defragmentation or an analysis of the application to generate application statistics. A user can be prompted 304 to confirm the information, e.g., via a dialog box within a graphical user interface (GUI). The application export method 300 may then verify the environment availability 306, including verifying that a target OS/DBMS is compatible with the source OS/DBMS. To ensure the application is not changed during the export process, the application export method 300 may isolate the application access 307 so that only the application export method 300 may access the application. The source OS/DBMS may then be installed on a first computing device and the selected target OS/DBMS installed on a second computing device, or the source and target may be installed on the same device. An application export and import operation may be performed on a single computer, which may cause the application export and import operation to defragment application data (e.g., reassembles the application on the target system in an efficient system structure). Thus, verifying 306 the environment availability 306 may include confirming an application copy tool version is compatible with the target OS and with a source system OS on which the application executes. In such instances where the application copy tool is not compatible with the target OS, a decision may be made to install a system copy tool on the target system or otherwise abort the method 300.

The application may then be copied or migrated from a source system to a target system. For example, if the source OS/DBMS and target OS/DBMS are compatible, the application may be copied exactly as it exists. If the source OS/DBMS and target OS/DBMS are not compatible, the application may be migrated from the source OS/DBMS to the target OS/DBMS. During migration, application export method 300 builds 308 the corresponding environment to receive the export. Building 308 the corresponding environment can include comparing the application and source system structure on the source OS/DBMS with the system structure on the target OS/DBMS. For example, comparison of a database structure can include comparing database label files, structure files, directory structure, or database statistics, and a complete database environment may be built on the target OS/DBMS corresponding to the source environment. Building the corresponding environment may include calculating the size of the target system and creating an export directory structure. For example, creating the export directory structure for a database may include creating label files, creating database structure files (e.g., files that contain information about the number, names, and widths of each field in the database), or updating a plurality of database statistics. Once the export directory structure has been created, the application export method 300 may create a plurality of application export files, where the export files include binary files, configuration files, and data files from the application.

After the environment has been built 308, all export process tasks and data storage is started 310, and the user is notified 312 of this action. Application information is stored 314 in a storage location, where the storage location may be on the target system, or may be on a network-attached storage (NAS) device accessible by the source OS/DBMS and target OS/DBMS.

When the system export has completed storing 314 data, all required and optional tasks may be completed 316, and the user may be notified 318. For example, optional tasks may include deleting temporary files or refreshing QA application data using a plurality of productivity system data. The user may be prompted 320 to restart a business application (i.e., an ERP or CRM application) that operates against the migrated data. If the user chooses not to start the business application, the user may be informed 321 of the completion of the export. Alternatively, if the user chooses to start the business application, various applications and modules within the business application may be started in the correct order 322, and user may be informed 324 of progress and status of the business system.

Figure 4:
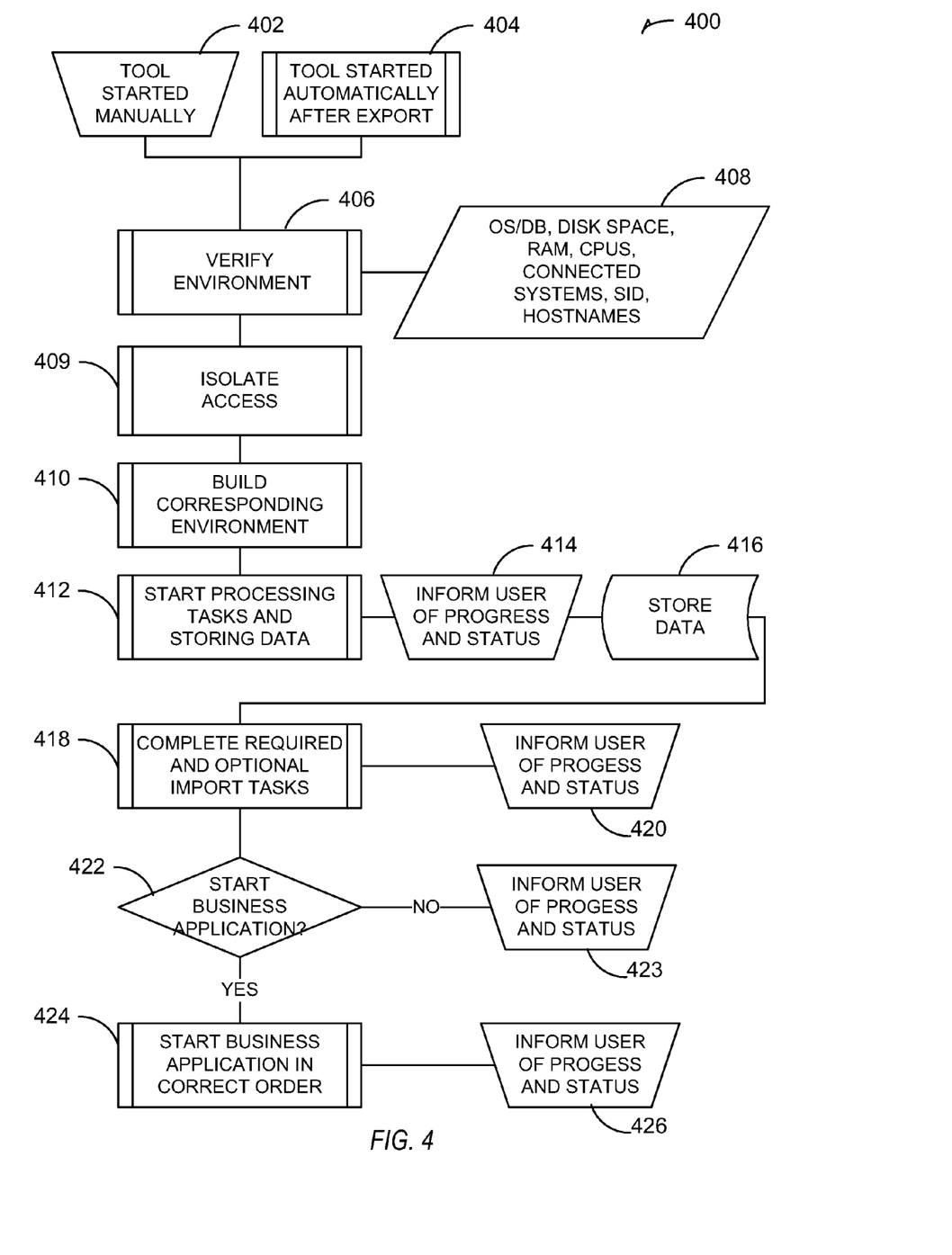
FIG. 4 is a logical block diagram of an application import method, according to an example embodiment.

FIG. 4 is a logical block diagram of an application import method 400, according to an example embodiment. The application import method 400 can be started manually 402 or can be started automatically after export 404. Once started, the application import 400 may execute optional pre-import tasks, including execution of one or more programs related to management of the application, OS, or DBMS. For example, a pre-import task can include execution of a local hard drive defragmentation or an analysis of the target system structure to generate system statistics. The method 400 may include verifying 406 the target system environment. Verification 406 the target system environment may include verifying 408OS, system type, disk space, amount of Random Access Memory (RAM), number and type of central processing units (CPUs), connected systems, system identification numbers, hostnames 408, among other system variables depending on the particular embodiment.

To ensure the target system is not changed during the import process, the application import method 400 may isolate the target system form access 409 so that only the application import method 400 may access the target system. The application import method 400 may then build 410 the corresponding environment to process and source the import. Once the environment has been built 410, export process tasks and data storage is started 412. The user may be notified 414 of this action and progress with regard to the application import method 400. The application import method may then store 416 the data in the target system. When the application import has completed storing data, all required and optional tasks may be completed 418, and the user may again be notified 420 of the progress. For example, optional tasks may include deleting temporary files or refreshing QA application data using a plurality of productivity system data. Once required and optional tasks are complete, a business application may be started 422, such as discussed above with regard to FIG. 3, allowing at least one enterprise application to access the application. Starting the business application 422 may include starting 424 the business application in a correct order and informing the user of progress and status 426 of the business application.

Figure 5:
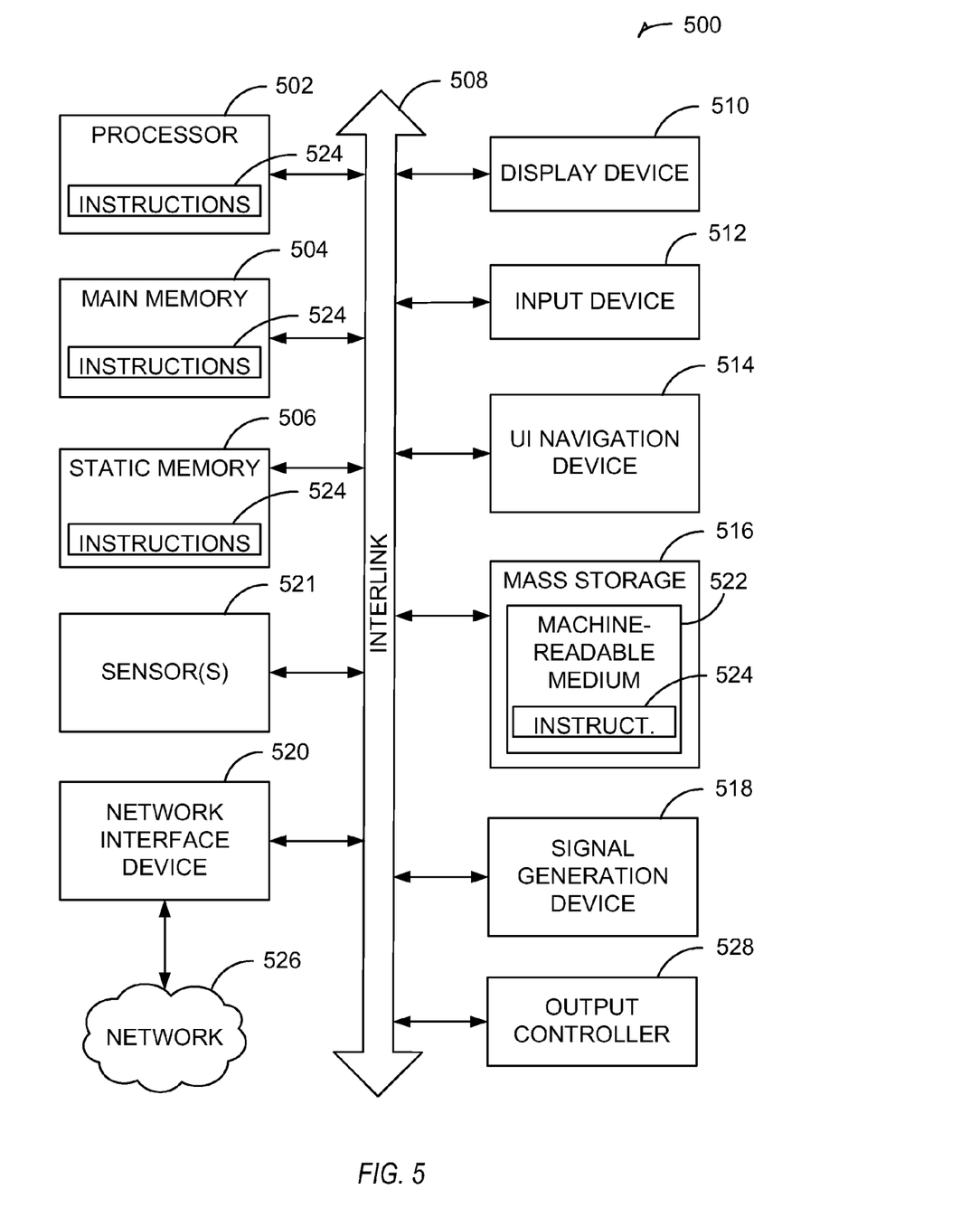
FIG. 5 is a block diagram illustrating an example of a machine upon which one or more embodiments may be implemented.

FIG. 5 illustrates a block diagram of an example machine 500 upon which any one or more of the techniques (e.g., methodologies) discussed herein may perform. In alternative embodiments, the machine 500 may operate as a standalone device or may be connected (e.g., networked) to other machines. In a networked deployment, the machine 500 may operate in the capacity of a server machine, a client machine, or both in server-client network environments. In an example, the machine 500 may act as a peer machine in peer-to-peer (P2P) (or other distributed) network environment. The machine 500 may be a personal computer (PC), a tablet PC, a set-top box (STB), a Personal Digital Assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine-readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Machine (e.g., computer system) 500 may include a hardware processor 502 (e.g., a central processing unit (CPU), a graphics processing unit (GPU), a hardware processor core, or any combination thereof), a main memory 504 and a static memory 506, some or all of which may communicate with each other via an interlink (e.g., bus) 508. The machine 500 may further include a display unit 510, an alphanumeric input device 512 (e.g., a keyboard), and a user interface (UI) navigation device 514 (e.g., a mouse). In an example, the display unit 510, input device 512 and UI navigation device 514 may be a touch screen display. The machine 500 may additionally include a storage device (e.g., drive unit) 516, a signal generation device 518 (e.g., a speaker), a network interface device 520, and one or more sensors 521, such as a global positioning system (GPS) sensor, compass, accelerometer, or other sensor. The machine 500 may include an output controller 528, such as a serial (e.g., universal serial bus (USB), parallel, or other wired or wireless (e.g., infrared (IR)) connection to communicate or control one or more peripheral devices (e.g., a printer, card reader, etc.).

The storage device 516 may include a machine readable medium 522 on which is stored one or more sets of data structures or instructions 524 (e.g., software) embodying or utilized by any one or more of the techniques or functions described herein. The instructions 524 may also reside, completely or at least partially, within the main memory 504, within static memory 506, or within the hardware processor 502 during execution thereof by the machine 500. In an example, one or any combination of the hardware processor 502, the main memory 504, the static memory 506, or the storage device 516 may constitute machine-readable media.

While the machine-readable medium 522 is illustrated as a single medium, the term "machine readable medium" may include a single medium or multiple media (e.g., a centralized or distributed system, and/or associated caches and servers) that arranged to store the one or more instructions 524.

The term "machine readable medium" may include any medium that is capable of storing, encoding, or carrying instructions for execution by the machine 500 and that cause the machine 500 to perform any one or more of the techniques of the present disclosure, or that is capable of storing, encoding or carrying data structures used by or associated with such instructions. Non-limiting machine-readable medium examples may include solid-state memories and optical and magnetic media. In an example, a massed machine-readable medium comprises a machine readable medium with a plurality of particles having resting (i.e., non-transitory) mass. Specific examples of massed (i.e., non-transitory) machine-readable media may include non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 524 may further be transmitted or received over a communications network 526 using a transmission medium via the network interface device 520 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, wireless data networks (e.g., Institute of Electrical and Electronics Engineers (IEEE) 802.11 family of standards known as Wi-Fi®, and IEEE 802.16 family of standards known as WiMax®), and peer-to-peer (P2P) networks, among others. In an example, the network interface device 520 may include one or more physical jacks (e.g., Ethernet, coaxial, or phone jacks) or one or more antennas to connect to the communications network 526. In an example, the network interface device 520 may include a plurality of antennas to communicate wirelessly using at least one of single-input multiple-output (SIMO), multiple-input multiple-output (MIMO), or multiple-input single-output (MISO) techniques. The term "transmission medium" shall be taken to include any intangible medium that is capable of storing, encoding, or carrying instructions for execution by the machine 500, and includes digital or analog communications signals or other intangible medium to facilitate communication of such software.

It will be readily understood to those skilled in the art that various other changes in the details, material, and arrangements of the parts and method stages which have been described and illustrated in order to explain the nature of the inventive subject matter may be made without departing from the principles and scope of the inventive subject matter as expressed in the subjoined claims.

What is claimed is:

1. A method comprising:
receiving a command from a requestor to copy a source application to a target system, the source application instantiated on a source computer system having an associated source operating system (OS) and the target system being a computer system having an associated target OS;
determining whether the source OS is compatible with the target OS;
when the source OS and the target OS are not compatible, starting a first automatic application copy process, the first automatic application copy process including:
locking the source application to prevent access thereto;
analyzing the source application to identify a structure thereof;
creating an equivalent structure on the target system;
copying the source application to a storage device;
unlocking the source application to restore access thereto; and
copying, from the storage device, the source application copy to the structure created on the target computer system.

2. The method of claim 1, further comprising:
when the source OS and the target OS are compatible, starting a second automatic application copy process, the second automatic application copy process including:
locking the source application to prevent access thereto;
copying the source application from the source computer system to a storage device;
unlocking the source application to restore access thereto;
copying, from the storage device, the source application copy to the target computer system.

3. The method of claim 1, wherein copying the source application to the target computer system includes:
determining whether the first application copy tool used to copy the source application from the source computer system is compatible with the target OS; and
when the first application copy tool is compatible with the target OS, importing, using the first application copy tool, the source application copy into the target OS.

4. The method of claim 3, wherein copying the source application from the source computer system includes:
when the first application copy tool is not compatible with the target OS, installing, on the target OS, a second application copy tool that is compatible with the target OS; and
importing, using the second application copy tool, the source application copy into the target OS.

5. The method of claim 1, wherein copying an application includes defragmenting the application.

6. The method of claim 1, further comprising generating a completion notification for the requestor, responsive to completion of copying the application.

7. The method of claim 1, further comprising starting, responsive to completion of copying the application, a business application on the target computer system, wherein the business application includes at least one enterprise application that accesses the application on the target computer system.

8. A non-transitory computer-readable medium, with instructions stored thereon that are executable by at least one processor of at least one computing device to cause the at least one computing device to:
receive a command from a requestor to execute an automated copy of a source application to a target system;
determine whether an operating system (OS) of a computer of the source application is compatible with the OS of a computer of the target system;
when compatible, start a first automatic application copy process to:
lock the source application;
identify a structure of the source application on the source system;
create, using the identified structure, an equivalent structure in the target system;
copy the source application to the target system; and
unlock the source application.

9. The non-transitory computer-readable medium of claim 8, wherein when the OS of the source and target systems are not compatible, the instructions are further executable to cause the at least one computing device to:
start a second automatic application copy process to:
lock the source application;
copy the source application to a storage medium;
unlock the source system; and
copy the source application copy from the data storage medium to the target system.

10. The non-transitory computer-readable medium of claim 8, wherein the first automatic application copy process:
determines whether a first application copy tool that copies the source application is compatible with the OS of the computer of the target system; and
when the first application copy tool is compatible with the OS of the computer of the target system, calls the first application copy tool to copy the source application to the target system.

11. The non-transitory computer-readable medium of claim 10, wherein the first automatic application copy process:
when the first application copy tool is not compatible with the OS of the computer of the target system, installs a second application copy tool on the computer of the target system that is compatible; and
calls the second application copy tool to copy the source application to the target system.

12. The non-transitory computer-readable medium of claim 8, wherein the copy of the source application is copied to the target system in a defragmented form.

13. The non-transitory computer-readable medium of claim 8, wherein the automatic application copy process, upon completion, further includes providing a completion notification to the requestor.

14. The non-transitory computer-readable medium of claim 8, wherein the automatic application copy process, upon completion, further includes issuing an application start command to a business application that accesses the copied application on the target system.

15. A system comprising:
at least one processor, at least one memory device, and at least one network interface device; and
an application copy module stored on the at least one memory device and executable by the at least one processor to:
receive a command from a requestor to copy a source application to a target system, the source application instantiated on a source computer system having an associated source operating system (OS) and the target system being a computer system having an associated target OS;

determine whether the source OS is compatible with the target OS;

when the source OS and the target OS are not compatible, start a first automatic application copy process, the first automatic application copy process to:

lock the source application to prevent access thereto;

analyze the source application to identify a structure thereof;

create an equivalent structure on the target system;

copy the source application to a storage device;

unlock the source application to restore access thereto; and copy, from the storage device, the source application copy to the structure created on the target computer system.

16. The system of claim 15, wherein the application copy module is further executable by the at least one processor, when the source OS and the target OS are compatible, to start a second automatic application copy process to:

lock the source application to prevent access thereto;

copy the source application from the source computer system to a storage device;

unlock the source application to restore access thereto;

copy, from the storage device, the source application copy to the target computer system.

17. The system of claim 15, wherein the application copy module is further executable by the at least one processor to:

determine whether the first application copy tool used to copy the source application from the source computer system is compatible with the target OS; and when the first application copy tool is compatible with the target OS, import, using the first application copy tool, the source system copy into the target OS.

18. The method of claim 17, wherein the system copy module is further executable by the at least one processor to:

when the first application copy tool is not compatible with the target OS, install, on the target OS, a second application copy tool that is compatible with the target OS; and import, using the second application copy tool, the source application into the target OS.

19. The system of claim 15, wherein the copy of the source application is stored to the at least one table in a defragmented form.

20. The system of claim 15, wherein the application copy module is further executable by the at least one processor to cause the application copy module to start, responsive to the completion of the copying of the application, an application on the target computer system, wherein the application includes at least one enterprise application that accesses the application on the target computer system.

* * * * *